United States Patent [19]
Winter et al.

[11] Patent Number: 5,303,160
[45] Date of Patent: Apr. 12, 1994

[54] LOAD CONTROLLER WITH DIGITALLY MODELED OVERLOAD PROTECTION AND ANALOG TRACKING OF HEAT STATE DURING POWER OFF

[75] Inventors: Marlan L. Winter, Hendersonville; Mark E. Innes, Asheville, both of N.C.

[73] Assignee: Westinghouse Electric Corp., Pittsburgh, Pa.

[21] Appl. No.: 819,900

[22] Filed: Jan. 13, 1992

[51] Int. Cl.$^5$ .......................... H02H 7/08; H02H 5/04
[52] U.S. Cl. ..................... 364/481; 364/483; 361/24; 361/37; 318/778
[58] Field of Search ............ 364/481, 483, 492; 361/24, 25, 37, 103, 94, 23; 318/778

[56] References Cited

U.S. PATENT DOCUMENTS

| | | | |
|---|---|---|---|
| 4,291,355 | 9/1981 | Dinger | 361/31 |
| 4,453,117 | 6/1984 | Elms et al. | 318/778 |
| 4,470,092 | 9/1984 | Lombardi | 361/23 |
| 4,547,826 | 10/1985 | Premerlani | 361/25 |
| 4,616,324 | 10/1986 | Simmel | 364/483 |
| 4,631,625 | 12/1986 | Alexander et al. | 361/94 |
| 4,695,961 | 9/1987 | Arinobu | 364/483 |
| 5,050,172 | 9/1991 | Elms et al. | 371/66 |
| 5,057,962 | 10/1991 | Alley et al. | 361/24 |

FOREIGN PATENT DOCUMENTS

147595 4/1981 German Democratic Rep. .

Primary Examiner—Thomas G. Black
Assistant Examiner—Julie D. Day
Attorney, Agent, or Firm—M. J. Moran

[57] ABSTRACT

Microprocessor based apparatus for controlling an electrical load, such as a motor, includes an external capacitor for storing an analog equivalent of a digitally modeled heat state signal, such as the $I^2t$ characteristic of the motor. The voltage on the capacitor decays to mimic motor cooling when the microprocessor is powered down with deenergization of the motor. The stored analog signal is updated by periodically converting the analog signal to a retrieved digital heat state signal which is compared to the latest calculated value of the heat state signal. If the retrieved value is below the present calculated value, an input/output port is set to a high output state to charge up the storage capacitor. If the retrieved value is above the calculated value, the port is configured as an output port with a low state to reduce the voltage on the capacitor. When the retrieved heat state signal equals the calculated signal, the port is configured as an input port with a high impedance to maintain the stored value on the capacitor. To maintain accuracy over a wide range with an 8-bit processor, the selected limiting value of the $I^2t$ characteristic is loaded into a large register and shifted n bits toward the most significant bit of the register until a ONE appears on the most significant bit. On power-up the 8-bit retrieved heat state signal is then loaded into the most significant bits of the register and shifted the n bits away from the most significant bit to bring it into the range of the selected limit value for the $I^2t$ characteristic. For updating the stored heat state signal, the latest calculated heat state signal is shifted n bits toward the most significant bit for comparison with the retrieved digital heat state signal.

4 Claims, 6 Drawing Sheets

LOAD CONTROLLER WITH DIGITALLY MODELED OVERLOAD PROTECTION AND ANALOG TRACKING OF HEAT STATE DURING POWER OFF

CROSS-REFERENCE TO RELATED APPLICATION

Commonly owned U.S. application Ser. No. 07/636,000, filed Dec. 28, 1990, whose inventors are J. C. Engel et al. and entitled "A Process For Auto Calibration Of A Microprocessor Based Overcurrent Protective Device and Apparatus."

BACKGROUND OF INVENTION

Field of the Invention

This invention relates to power switches for electrical loads such as motors incorporating protection for current overloads. More particularly, it relates to a microprocessor controlled load controller which digitally models, with an adjustable range, the heat state of the motor, in combination with an external analog circuit which tracks the heat state of the motor when the controller is powered down for use by the controller as an initial value when power is restored.

Background Information

Conventionally, motor controllers have been electromechanical devices which connect an electric motor to and disconnect the motor from an electric power source. Commonly, the controller is combined with an overload relay in a motor starter. The overload relay operates the contactor in the starter to disconnect power from the motor under overload conditions. Typically, the overload relay tracks the $I^2t$ characteristic of the motor which is a measure of motor heating, and prevents restarting of the motor following an overload until the motor has cooled sufficiently. The electromechanical motor starters operate on 120 volts, or line power, and it is common to control them through remote switching of the power.

Recently, motor controllers have been developed which are controlled by a microprocessor. The microprocessor provides the opportunity for much greater flexibility in the control features of the motor controller. The microprocessor based motor controllers model the $I^2t$ characteristic. They are usually controlled by logic level signals and remain powered when power is disconnected from the motor so that they can calculate the cooling of the disconnected motor.

In some installations, it is desirable to replace the electromechanical motor starter which is controlled through remote switching of the power with a microprocessor based motor starter A difficulty arises in maintaining the protection feature when the power to the microprocessor is cycled. Most microprocessor based protective devises employ some sort of memory backup system. These backup systems include the use of non-volatile ram, EEprom, battery backup, and supercap (capacitor) backup power. In the case of the non-volatile ram and the EEprom, the value stored in the memory device does not decay, and may result in long cooling delays once power is reapplied. Battery backup, and supercap schemes allow for the microprocessor to decrement the $I^2t$ value when the main power source is interrupted. However, these schemes are expensive, bulky, complex and require a good bit of additional software They are not well suited for cycling applications, and are intended to compensate for infrequent power outages.

One problem faced by the microprocessor based starters is storage of accurate values for the entire range of $I^2t$ characteristics which can be handled by the starter. The problem of the range of stored numbers can be reduced by using a 10 or 12 bit analog-to-digital converter at the expense of greater cost.

There remains a need therefore for an improved microprocessor based load controller which allows the decay rate of the motor heat characteristic to mimic the cooling of the motor even when the power is removed from the starter.

There is a further need for such an improved microprocessor based load controller which provides for storage of the digitally modeled motor heat characteristic to be stored prior to power outages and retrieved after power outages simply, accurately and cost effectively.

There is additional need for such an improved microprocessor based load controller which accommodates for adjustable motor heat characteristic range selection.

SUMMARY OF THE INVENTION

These and other needs are satisfied by the invention which directed to a microprocessor based load controller which digitally models the heat state of the load and compares it with a selectable limit to protect against overloads. The microprocessor is deenergized when the load is deenergized. In order to preserve overload protection, and prevent unnecessary delays in reenergizing, the digitally modeled heat state signal is stored as an external analog heat state signal which decays to mimic load cooling when power is removed from the load. Converter means responsive to powering up of the microprocessor generates from the analog heat state signal as decayed, a retrieved digital heat state signal which is then used by the digital control means as an initial value for resumption of the protection function.

The power down retention means on which the analog heat state signal is stored is preferably a storage capacitor with a bleed resistor having a value selected to bleed voltage on the storage capacitor at a rate approximating cooling of the electric load when deenergized.

The digital control means includes means to periodically adjust the voltage on the storage capacitor to a value equivalent to the digitally modeled heat state signal. This adjusting means includes comparison means which compares the retrieved digital heat state signal to the digitally modeled heat state signal and means to selectively increase or decrease the voltage on the storage capacitor in response to the comparison to make the analog heat state signal equivalent to the digitally modeled heat state signal. The voltage on the capacitor is increased or decreased through a digital port which is set in response to the comparison to a high state to increase the voltage on the storage capacitor and to a low state to reduce the voltage on the storage capacitor. This digital port is selectable as an input port with a high impedance and as an output port which is selectively settable at the high state and low state. If the retrieved digital heat state signal equals the digitally modeled heat state signal, the port remains as an input port to retain the value stored on the capacitor.

As another aspect of the invention, the digital processor is uniquely operated to maintain the accuracy of the stored analog heat state signal over a wide range. To this end, the digital control means is an X-bit digital processor which includes a Y-bit register. The converter is an X-bit analog to digital converter which generates an X-bit retrieved digital heat state signal. The X-bit retrieved digital heat state signal is loaded into the X-most significant bits in the Y-bit register, and is shifted n bits away from the most significant bit with n selected to place the retrieved heat state signal in the Y register in a range common with the digitally modeled heat state signal. The number of bits n by which the retrieved heat state signal is shifted is established by loading a selected limit for the digitally modeled heat state signal determined by the load being controlled, and shifting that limit n bits toward the most significant bit until a digital one appears in the most significant bit.

For comparing the retrieved digital heat state signal with the digitally modeled heat state signal, the digitally modeled heat state signal is shifted n bits toward the most significant bit of the Y-bit register, and the X-most significant bits of the Y-bit register are then compared with the retrieved digital heat state signal. Again, n is determined by loading the digitally modeled heat state limit into the Y-bit register and shifting it n bits toward the most significant bit until a one appears in the most significant bit.

BRIEF DESCRIPTION OF THE DRAWINGS

A full understanding of the invention can be gained from the following description of the preferred embodiments when read in conjunction with the accompanying drawing in which.

DESCRIPTION OF THE PREFERRED EMBODIMENT

A complete description of a load controller such as a motor starter to which the present invention is applied is provided in the above identified related application which is hereby incorporated by reference The same reference characters will be used in this application to identify elements common with those in the related application.

Figure 1:
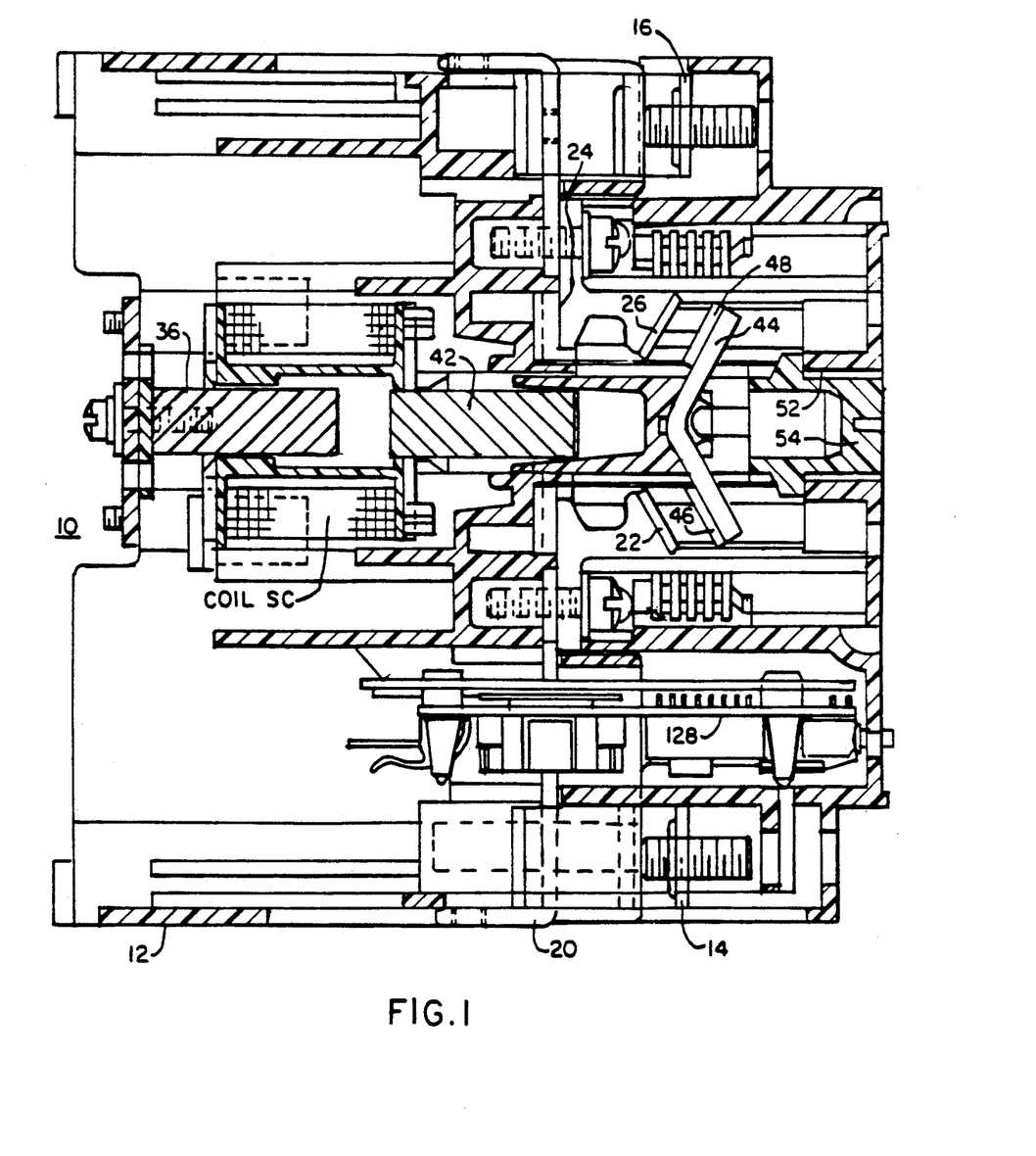
FIG. 1 is a sectional view through a microprocessor based load controller incorporating the invention.

Referring to FIG. 1, the motor starter 10 has an insulated housing 12. A pair of spaced apart terminals 14, 16 for each phase (only one phase shown) are provided for connecting an electrical load, such as a motor winding which is to be controlled by the motor starter device 10, to a power source. Terminal 14 is interconnected with an internal conductor 20 leading to a fixed contact 22 while terminal 16 is interconnected with an internal conductor 24 connected to a fixed contact 26. A contact carrier 42 supports an electrically conductive contact bridge 44 having movable contacts 46, 48 at opposite ends which are complimentary with the fixed contacts 22, 26, respectively.

Movement of the contact carrier 42 and therefore the contact bridge and moveable contacts 46, 48 is effected by a magnet 36 having a coil SC. The coil SC is in turn controlled by a circuit board 128 to be described in detail below. The carrier 42 is spring biased to the position shown in FIG. 1 in which the contact pairs 20, 46 and 26, 48 are opened to interrupt the circuit between terminals 14 and 16. When the coil SC is energized, the carrier 42 is pulled down against the magnet 36 to close the contact pairs 20, 46 and 26, 48 thus completing a circuit to energize the load, such as a motor winding connected to the motor starter 10.

Figure 2A:
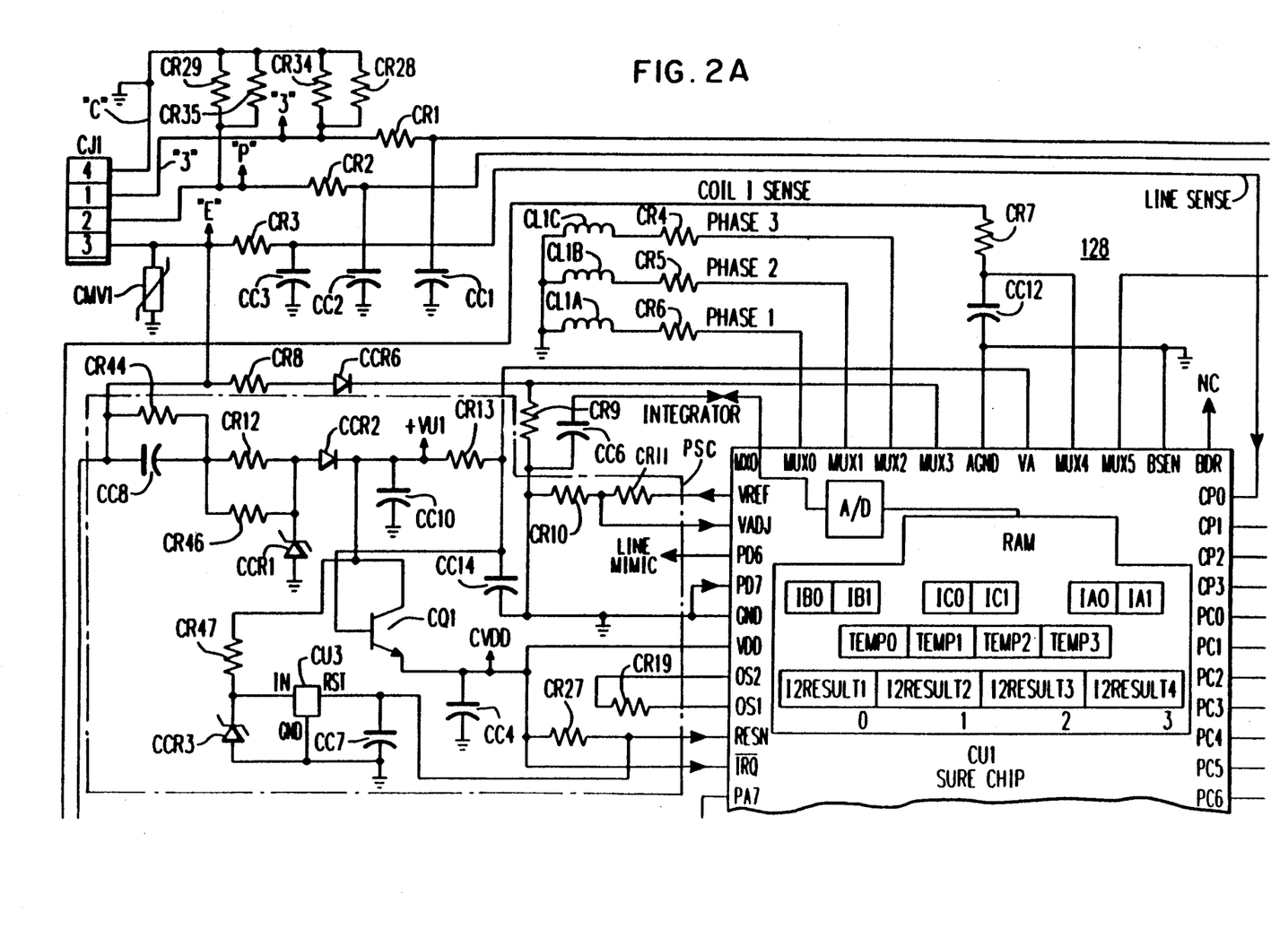
FIGS. 2A-2C illustrates a schematic circuit diagram of the microprocessor based load controller of FIG. 1.
Figure 2B:
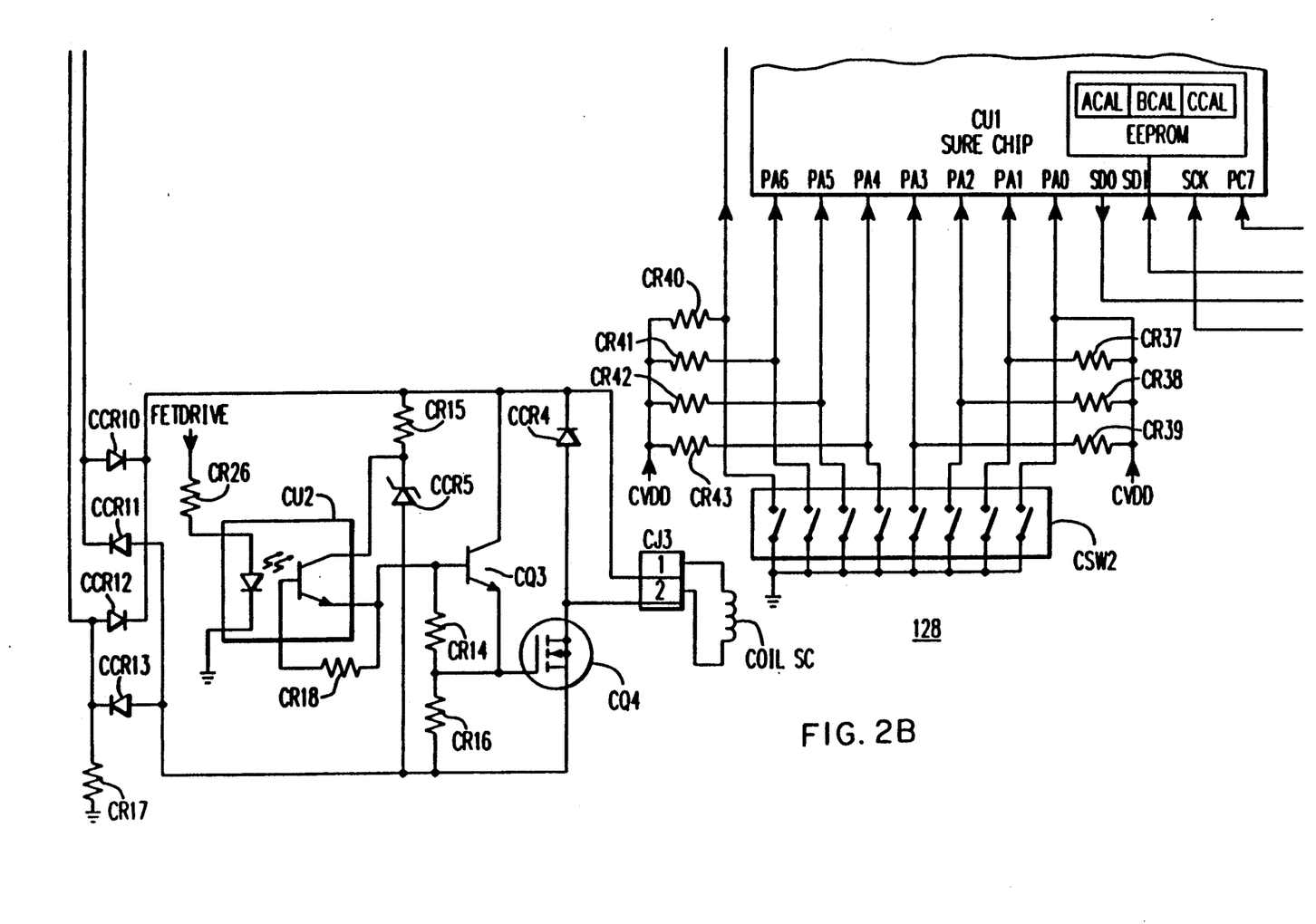
Figure 2C:
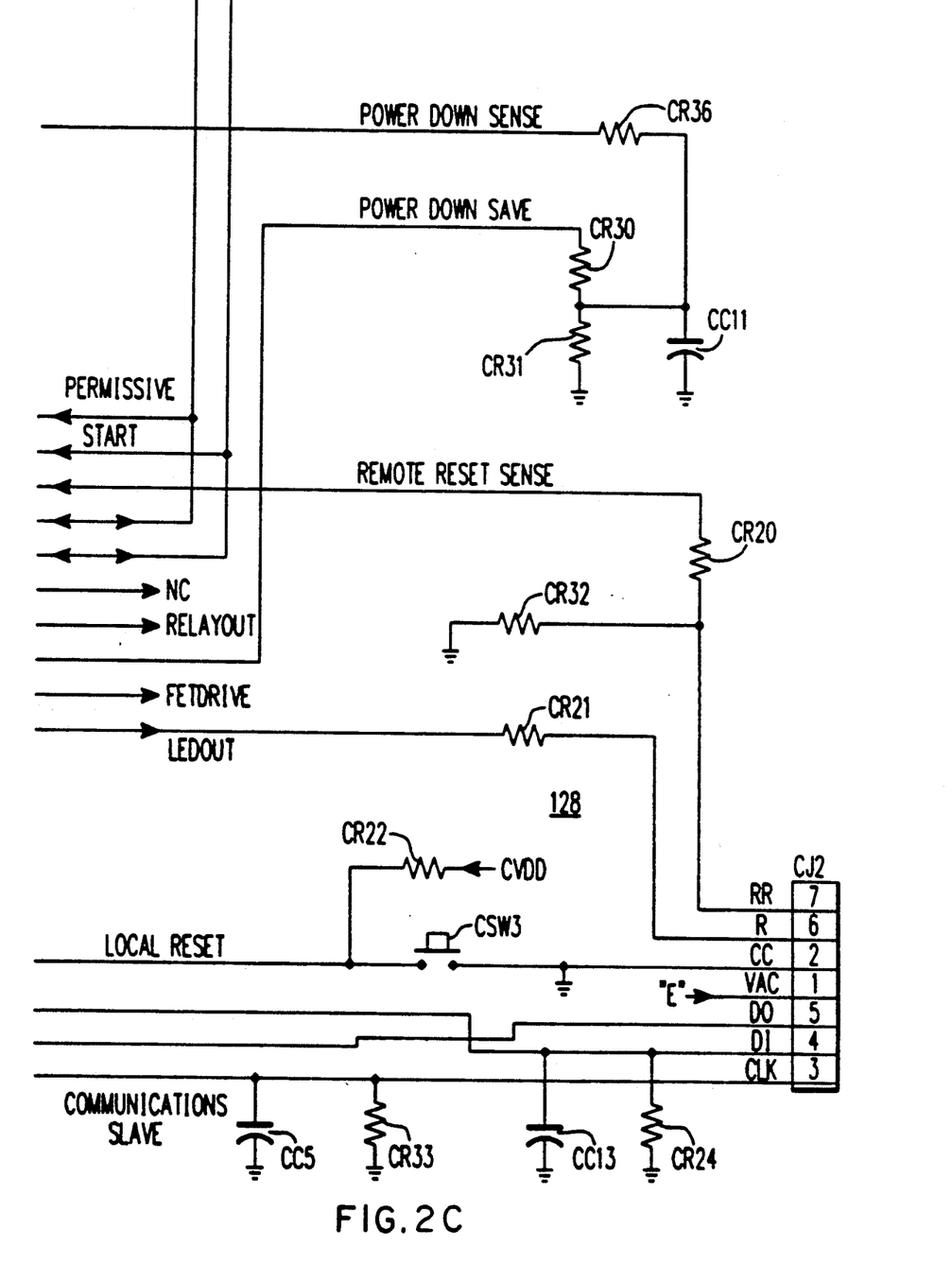

FIGS. 2A-2C together illustrate a schematic circuit diagram for the control board 128 which controls operation of the motor starter coil SC. The heart of the control circuit 128 is a microprocessor provided on the integrated circuit chip CU1. A suitable microprocessor chip CU1 is the "sure chip" which is disclosed in more detail in the above cross-referenced application. The chip CU1 includes a multiplexer, in addition to the processor, memory, and analog and digital input and output interfaces.

Returning to FIG. 2A, four inputs labeled 1–4, are provided on an input connector CJ1. Terminal 4 is connected to system common or ground and is designated the "C" input. Terminal 1 of the connector CJ1 inputs a start signal which is identified as "3" and is applied to the chip CU1 to start the motor. Terminal 2 of the connector CJ1 provides a permit signal "P" which must be present in order for the motor to run. Terminal 3 of the connector CJ1 receives the 120 volt line voltage which is designated as the signal "E". This line voltage signal "E" provides power for operation of the microprocessor CU1 and for energization of the contactor coil SC, as well as providing a timing signal for the microprocessor to gate portions of the line current to the contactor coil SC. The signals "3", "P", and "E", are passed through low pass filters formed by the resistors CR1-CR3 and capacitors CC1-CC3 before being applied to the chip CU1. A varistor CMV1 protects the circuit from surges in the line voltage.

A power supply circuit PSC fed by the line voltage signal "E" provides regulated voltages for the chip CU1. Current transformers CL1A, CL1B and CL1C monitor the threephase load current for input to the chip CU1 through multiplexer inputs MUX0-MUX2. The system voltage as represented by the "E" signal is input through multiplexer input MUX3.

The ac line signal "E" is rectified by the bridge circuit formed by the diodes CCR10–CCR13 to generate dc current for energizing the contactor coil SC. Energization of the coil SC of the dc current is controlled by a FET, CQ4. The FET CQ4 in turn is controlled by a FETDRIVE signal generated by the chip CU1. The FETDRIVE signal is isolated from the power circuit by an opto-isolator chip CU2. A transistor CQ3 forms with the photodiode of the opto-isolator CU2, a Darlington circuit which controls turn-on of the FET CQ4. The FETDRIVE signal is a pulse signal synchronized by the chip CU1 to the cycles of the line current to input the required amount of energy to close the contactor, and at a reduced level of energization to maintain the contactor closed. A measure of the coil current is fed back to the chip CU1 as the "COIL I SENSE" signal which is applied to the MUX4 multiplexer input of the chip CU1 through a low pass filter formed by the resistor CR7 and capacitor CC12.

The motor starter 10 provides overload protection for the motor connected to the starter. A set of dip switches CSW2 provides for selection of the rated current for the motor being controlled through the inputs PA1-PA6 of the chip CU1. The dip switches also provide for selection of two trip delays through inputs PA0 and PA7.

Turning to FIG. 2C, an external capacitor CC11 stores the $I^2t$ characteristic value generated by the chip CU1. This value is applied to the capacitor CC11 through the port PC4 and resistor CR30. The value of the $I^2t$ characteristic stored in the capacitor CC11 decays by discharge through a resistor CR31 at a rate which mimics the cooling of a motor controlled by the starter 10 when power has been removed from the circuit board 128.

The charge stored on the capacitor CC11 is read by the chip CU1 through the multiplexer input MUX5 which is connected to the capacitor CC11 through the resistor CR36.

The starter 10 can be reset remotely by a signal received through a connector CJ2 and applied to the chip CU1 as a REMOTE RESET SENSE signal. The chip CU1 also generates a LEDOUT signal through the connector CJ2 for energization of an LED on a remote console for indicating the operating mode of the starter. The starter 10 can also be reset locally by activation of the switch CSW3. The microprocessor based motor starter can communicate with, and be controlled by, a remote station through a serial data input port SDI and a serial data output port SDO synchronized by a clock signal which is input through port SCK. The remote clock signal and the serial data input and output signals are connected to the remote system through terminals on the connector CJ2.

The motor starter 10 monitors the current in each phase of the motor being controlled and calculates the $I^2t$ characteristic. This calculated value of $I^2t$ is compared with a selected trip value. If the trip value is exceeded, the coil SC is deenergized causing the contactor to open and interrupt current to the motor. Under normal operating conditions, the motor is turned off by interrupting the line signal "E". As the line signal "E" energizes the power supply PSC for the microprocessor chip CU1, interruption of the signal "E" deenergizes the microprocessor chip CU1.

In order to maintain the $I^2t$ characteristic when the microprocessor chip CU1 is deenergized, the $I^2t$ value is stored on the external capacitor CC11. The stored value of $I^2t$ is kept current by a routine which repetitively reads the stored value and compares it to the most recent calculated value. The stored value of $I^2t$ represented by the voltage on the capacitor CC11 is read into the microprocessor through the multiplexer input MUX5. If the stored value of $I^2t$ is below the latest calculated value, the input/output port PC4 of the chip CU1 is changed from the input mode to the output mode, and a logical high is output. The capacitor CC11 charges rapidly since it is being driven from approximately 5 volts. If the $I^2t$ value stored on the capacitor CC11 is greater than the latest calculated value, then the port PC4 is changed from the input state to the output state, and a logic low is output. The capacitor CC11 then discharges slowly through the resistors CR30 as it is being driven by the stored value of the $I^2t$ characteristic which at 100% is less than 0.7 volts. If the calculated $I^2t$ value and the actual value stored on a capacitor CR11 are the same, the port PC4 is maintained in the input mode which presents a high impedance to the capacitor CC11.

It is important to note that times used to charge and discharge the capacitor CC11 are approximately the same, but that the capacitor charges much faster than it discharges. This very desirable effect allows a very simple algorithm to control the value of the cap with great stability. The system will always err on the side of storing too much $I^2t$, if it errs at all.

When the starter 10 is not under power, the external bleeder resistor CR31 discharges the capacitor CC11 to reduce the value of $I^2t$ stored on the capacitor at a rate which mimics motor cooling. One key to ensuring that the voltage stored on the capacitor CC11, which represents the $I^2t$ characteristic, is maintained during power off is to be sure that the maximum voltage stored on the capacitor CC11 is always less than the forward diode drop of the processor clamping resistors.

Figure 3:
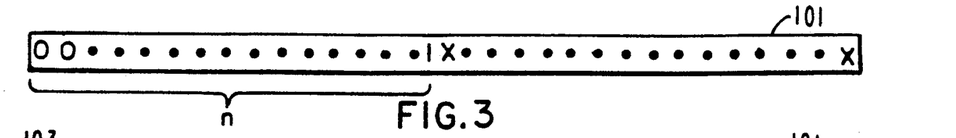
FIGS. 3-8 illustrate examples of the contents of a register of the microprocessor based load controller operated in accordance with invention.
Figure 4:
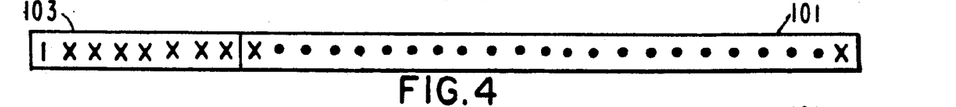
Figure 5:
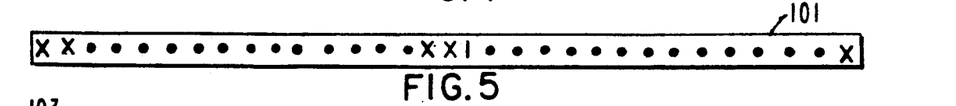
Figure 6:
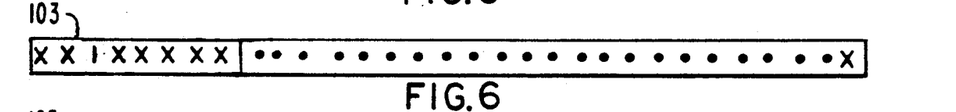

Another aspect of the invention is directed to efficiently and cost-effectively manipulating the stored data for the $I^2t$ characteristic while maintaining accuracy over a broad range of values. The chip CU1 has an 8 bit microprocessor, however, the $I^2t$ characteristic is represented by 5 bytes (40 bits) to provide a wide range of protection. In order to isolate the eight most significant bits of the $I^2t$ value for storage on the capacitor CC11, the selected $I^2t$ trip value for the particular motor being protected is read into the register 101 as shown in FIG. 3. The $I^2t$ trip value is then shifted n times to the left until a one appears in the most significant bit as shown in FIG. 4. The current value of the $I^2t$ characteristic is then loaded into the register 101 as shown in FIG. 5 and shifted n times to the left as shown in FIG. 6. The eight most significant bits of the register 101 shown in FIG. 6 are then stored on the capacitor CC11 in a manner described above through comparison with the retrieved value of $I^2t$ and pulsing of the output port high or low. The number of shifts n applied to the calculated value of the $I^2t$ characteristic must be periodically determined, as the trip value selected by the dip switches CSW2 may be changed by an operator during operation of the motor controller 10.

Figure 7:
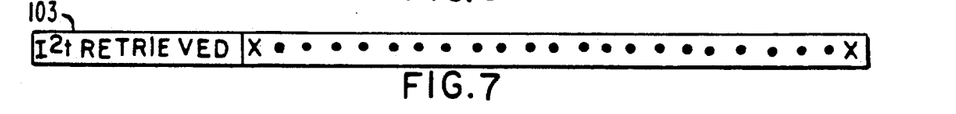
Figure 8:
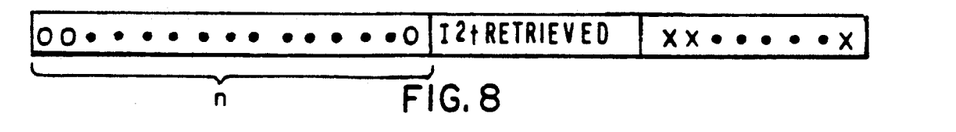

When retrieving the $I^2t$ stored on a capacitor CC11 on power up, the voltage stored on the capacitor CC11 is read using an 8 bit analog to digital converter at MUX5 input. The result is stored as $I^2t$ retrieved. The $I^2t$ trip level of the unit setup is then sorted, as described in connection with FIGS. 3 and 4, to determine the number of shifts to the left required to move a one into the most significant bit of the most significant byte of its stored field. The $I^2t$ retrieved value is then loaded into the most significant byte as illustrated in FIG. 7. $I^2t$ retrieved is then shifted right n times as illustrated in FIG. 8. This value is then used as the initial value of $I^2t$.

Figures 9, 10:
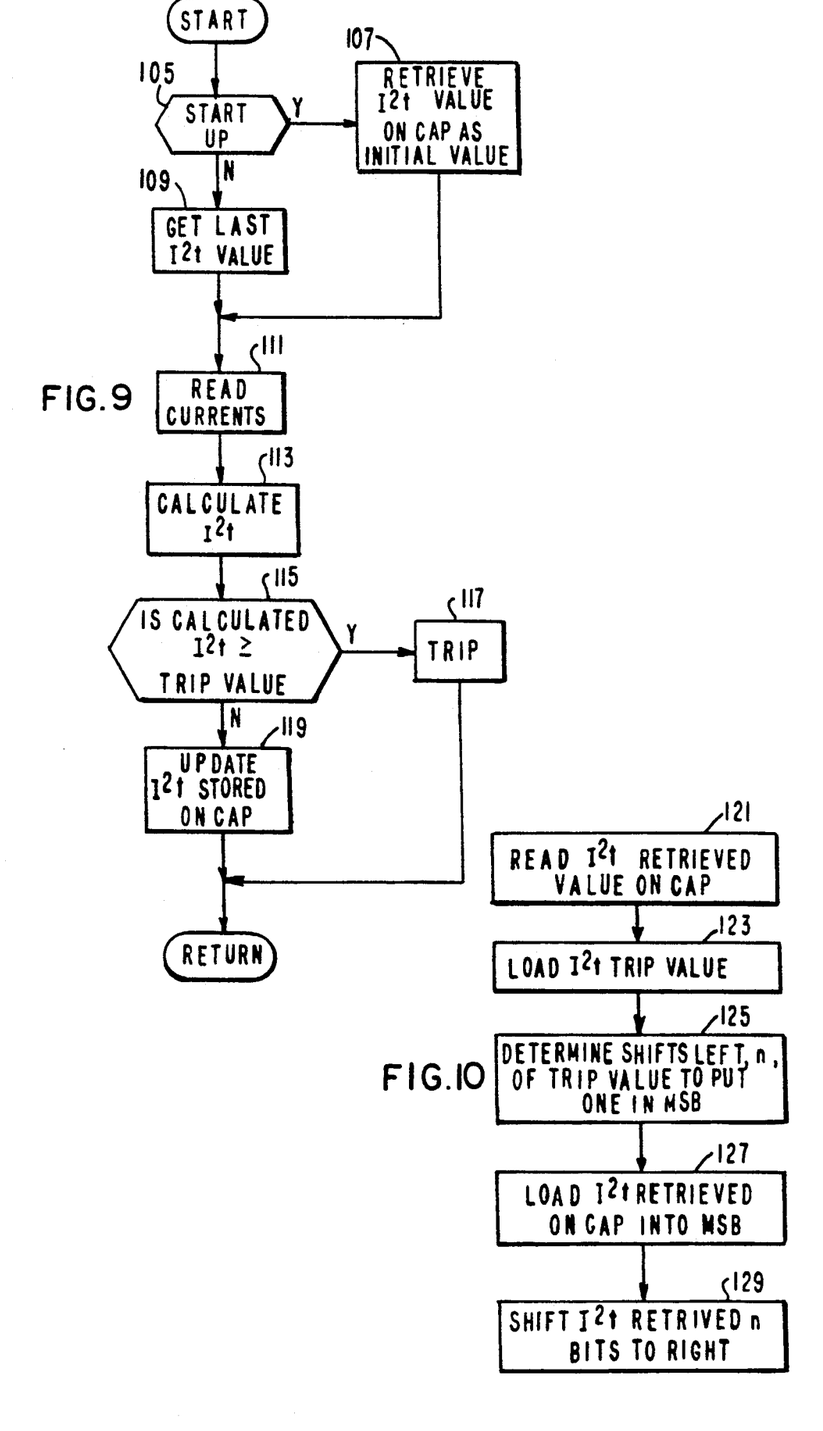
FIGS. 9-11 are flow charts of software for the microprocessor based load controller of the invention.
Figure 11:
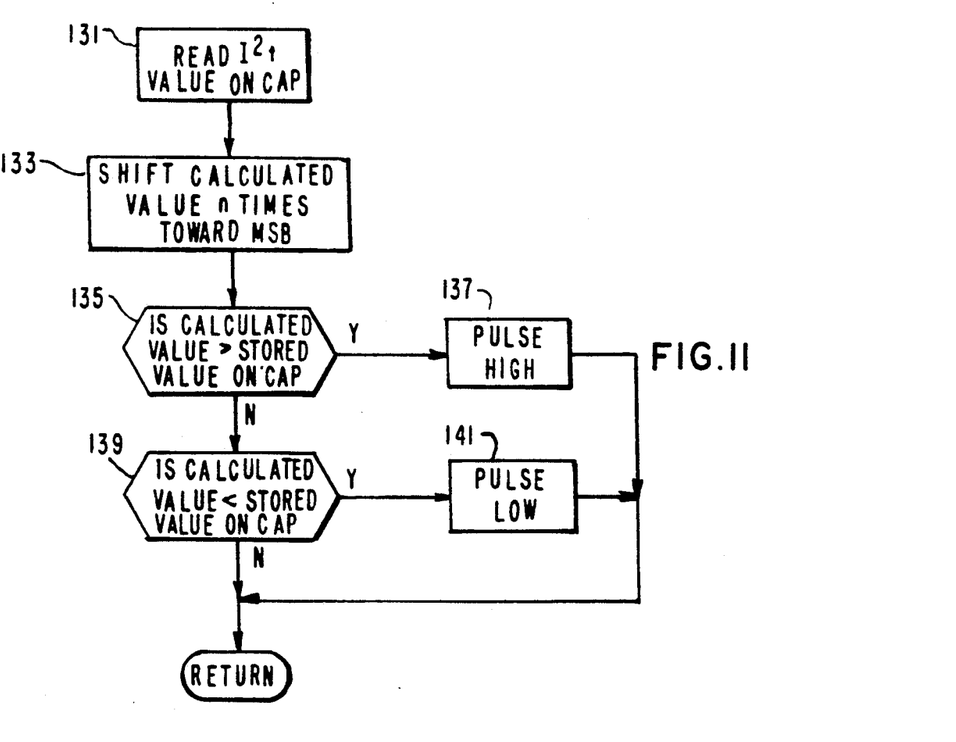

Suitable software for implementing the above scheme for storing the $I^2t$ characteristic value on the external capacitor CC11, for periodically updating the stored value, and for retrieving the stored value are illustrated by the flow charts of FIGS. 9, 10 and 11. FIG. 9 illustrates the main routine which is periodically run. First, a determination is made at 105 as to whether the system is in the start-up mode following a resumption of power. If it is, the $I^2t$ value stored on the capacitor is retrieved as the initial value at 107. If the system is not in the start-up mode, the last $I^2t$ value is retrieved at 109. The three-phase currents are read at 111 and the new $I^2t$ value is calculated at 113. The latest calculated value of the $I^2t$ characteristic is compared to the trip value 115. If the calculated value is equal to or exceeds the trip value, a trip is generated at 117. Otherwise, the $I^2t$ characteristic on the capacitor is updated.

FIG. 10 illustrates the routine for retrieving the $I^2t$ characteristic stored on the capacitor. First, the voltage stored on the capacitor is read into the microprocessor through an A-D converter, as indicated at 121. The $I^2t$ trip value is then loaded at 123 and shifted left n times until a ONE appears in the most significant bit as indicated at 125. The $I^2t$ retrieved is then loaded into the 5 most significant bits at 127 and is shifted to the right n times at 129.

FIG. 11 illustrates the routine for updating these $I^2t$ characteristic stored on the capacitor. The value on the capacitor is read at 131. The calculated value of $I^2t$ is then shifted toward the most significant bit n times as indicated at 133 and compared with the retrieved value. If the most recently calculated value of $I^2t$ is more than the stored value retrieved from the capacitor, as determined at 135, the capacitor is pulsed high at 137. If the calculated value of $I^2t$ is of less than the stored value retrieved from the capacitor as determined at 139, the capacitor is pulsed low to remove charge as indicated at 141. If the calculated value equals the stored value of $I^2t$, as indicated by the fact that it is neither greater than, nor less than the stored value, no pulses are generated and the voltage on the capacitor is undisturbed.

It should be noted that the maximum value of $I^2t$ stored on the capacitor CC11 varies with, and in fact equals, the selected trip value. With the invention, it is not necessary that this maximum stored value be normalized; that is, it is not necessary that the maximum value of the $I^2t$ characteristic stored on the capacitor be the same for all trip setting which would require additional processing. The RC circuit used to store, and decay the stored valve provides the same percentage reduction in the stored value over the same time interval for all maximum stored values.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for connecting an electrical load to an electric power and providing overload protection for said electrical load, said apparatus comprising:

separable contacts selectively connecting said electrical load to said electric power source when closed and interrupting current flow to said electrical load when open;

electromagnetic means closing said separable contacts when energized and opening said separable contacts when deenergized;

digital control means responsive to current supplied to said electrical load from said electric power source with said separable contacts closed to generate a digitally modeled load heat state signal, and operative to deenergized said electromagnetic means to open said separable contacts and deenergize said electrical load when said digitally modeled heat state signal exceeds a selected limit, said digital control means being powered down when said separable contact are open;

power down retention means generating and storing an analog heat state signal which is an analog equivalent of said digitally modeled heat state signal, and including means decaying said analog heat state signal at a rate approximating cooling of said electrical load when said separable contacts are open and current to said electrical load is interrupted; and converter means responsive to powering up of said digital control means to generate from said analog heat state signal, as decayed, a retrieved digital heat state signal, said digital control means including means utilizing said retrieved digital heat state signal as an initial value of said digitally modeled heat state signal in response to powering up of said digital control means, said digital control means comprising an X-bit digital processor which includes a Y-bit register having X most significant bits including a most significant bit with Y being greater than X, and said converter means being an X-bit analog to digital converter which generates an X-bit retrieved digital heat state signal, and including means entering said X-bit retrieved digital heat state signal generated by said analog to digital converter into said X most significant bits in said Y-bit register, and shift means shifting said X-bit retrieved digital heat state signal n bits away from said most significant bit in said Y-bit register, where n is selected to place said retrieved digital heat state signal in said Y-bit register in a range common with said digitally modeled heat state signal.

2. The apparatus of claim 1 including means selecting n comprising means loading a preselected limit value of said digitally modeled heat state signal into said Y-bit register, and means repetitively shifting said limit value a number of times towards said most significant bit of said Y-bit register until a digital ONE appears in said most significant bit, with n being selected as said number of times the limit value is shifted to place a ONE in the most significant bit.

3. The apparatus of claim 2 wherein x equals 8.

4. Apparatus for connecting an electrical load to an electric power and providing overload protection for said electrical load, said apparatus comprising:

separable contacts selectively connecting said electrical load to said electric power source when closed and interrupting current flow to said electrical load when open;

operating means closing said separable contacts;

digital control means responsive to current supplied to said electrical load from said electric power source with said separable contacts closed to generate a digitally modeled load heat state signal and operative to control said operating means to open said separable contacts and deenergize said electrical load when said digitally modeled heat state signal exceeds a selected limit, said digital control means being powered down when said separable contacts are open;

power down retention means comprising a storage capacitor storing a voltage representing an analog heat state signal which is an analog equivalent of said digitally modeled heat state signal, and bleed means having a value selected to bleed the voltage on said storage capacitor at a rate approximating cooling of said electrical load when deenergized; and converter means responsive to powering up of said digital control means to generate from said analog heat state signal, a retrieved digital heat state signal, said digital control means including means utilizing said retrieved digital heat state signal as an initial value of said digitally modeled heat state signal in response to powering-up of said digital control means, said digital control means including adjusting means periodically adjusting the voltage on said storage capacitor to a value equivalent to the digitally modeled heat state signal and comprising comparison means comparing said retrieved digital heat state signal to said digitally modeled heat state signal, and means responsive to said comparison means selectively adjusting the voltage on said storage capacitor to make said analog heat state signal equivalent to said digitally modeled heat state signal, said digital control means comprising an X-bit digital processor which includes a Y-bit register having X most significant bits including a most significant bit with Y being greater than X, and said converter means comprising an X-bit analog to digital converter which generates an X-bit retrieved digital heat state signal, and including means loading said selected limit into said Y-bit register and shifting said limit n bits towards said most significant bit until a digital ONE appears in said most significant bit, and means loading said digitally modeled heat state signal into said Y-bit register and shifting it said n bits toward said most significant bit, and wherein said comparison means compares the X most significant bits of said Y-bit register with said retrieved digital heat state signal.

* * * * *